March 24, 1953 R. I. POTTER 2,632,432
INTERNAL-COMBUSTION ENGINE
Filed Oct. 10, 1950
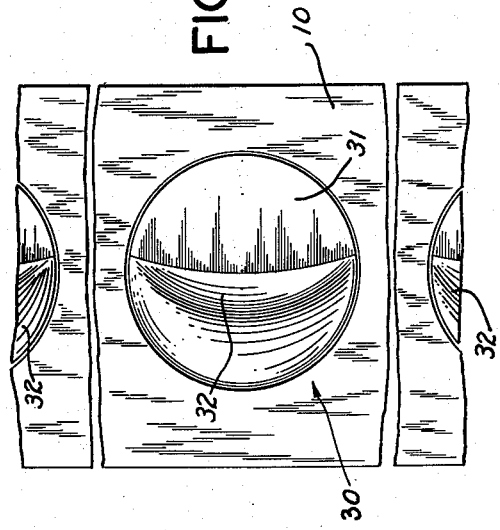
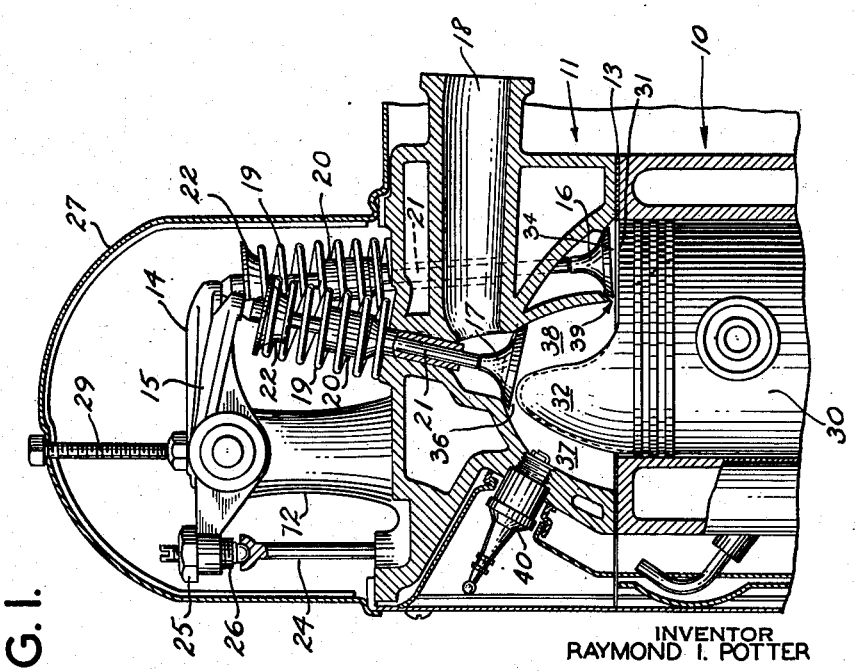
INVENTOR
RAYMOND I. POTTER
BY
Campbell, Brumbaugh, Free & Graver
his ATTORNEYS.

Patented Mar. 24, 1953

2,632,432

UNITED STATES PATENT OFFICE 2,632,432

INTERNAL-COMBUSTION ENGINE

Raymond I. Potter, Lorain, Ohio, assignor to The Standard Oil Company, Cleveland, Ohio, a corporation of Ohio Application October 10, 1950, Serial No. 189,334

3 Claims. (Cl. 123—191)

The present invention relates to an internal combustion engine and more particularly to an improvement in the combustion chamber structure thereof which effectively prevents pre-ignition of the engine and yet provides a high compression ratio.

This application is a continuation-in-part of my earlier application Serial No. 62,264, filed November 27, 1948, now abandoned.

Difficulty has been encountered with prior structures of this general character in that premature detonation often occurs tending to make the engine operate unevenly, and it is an object of the present invention to provide a novel combustion chamber structure which controls the firing of a cylinder and at the same time increases the compression ratio.

In an internal combustion engine, including essentially a cylinder block, a cylinder head mounted on the cylinder block, and a piston mounted for reciprocation in the cylinder block, the combustion chamber is formed by the cylinder head, the head of the piston and, in L-head engines and some types of valve-in-head engines, by a portion of the top of the cylinder block. The wall formed by the piston head is movable and the others, excluding the portions occupied by valves, are fixed.

In accordance with the present invention the combustion of a combustible mixture of gases in the combustion chamber is improved while the compression ratio is increased by dividing the combustion chamber into two or more combustion zones and providing a quenching zone for each combustion zone. This is accomplished by providing a promontory extending from the piston head or the cylinder head to within at least about 0.05 inch of the other of said surfaces and further providing two opposed surfaces, one on the piston head and the other on the cylinder head, that approach one another closely when the piston reaches the top of its stroke. The promontory and the opposed and adjacent wall surface of the combustion chamber momentarily form an extremely narrow passage which, by reason of the relatively high ratio of wall area to enclosed volume, becomes a quenching zone momentarily dividing the combustion chamber into two combustion zones.

Other portions on the surfaces on the cylinder head and piston head that approach one another closely when the piston reaches the top of its stroke likewise form a quenching zone due to the relatively high ratio of wall area to enclosed volume. This second quenching zone is formed adjacent one of the two combustion zones and remote from the first quenching zone.

In the preferred embodiment of the invention the promontory is on the piston head and forms, when the piston is at the top of its stroke, a first quenching zone with the immediately adjacent surface of the cylinder head effectively dividing the combustion chamber into a first combustion zone containing the ignition means, e. g., a spark plug, and a second combustion zone, the volume of the first combustion zone being between about 20 and 50% of the volume of the entire combustion chamber. The second quenching zone is formed by a flat portion of the piston head remote from the promontory and a substantially flat opposed surface of the cylinder head, there being very little clearance between the two last named flat surfaces when the piston is at the top of its stroke.

While the invention is specifically described herein as applied to a valve-in-head engine, it is to be understood that it may be applied with equal facility to L-head, F-head and other types of internal combustion engines.

The invention will be more clearly understood from the following description made with reference to the accompanying drawings, in which:

Figure 1 is a view in end elevation, partly broken away, to show a piston structure in accordance with the present invention; and Figure 2 is a plan view of the piston structure of Figure 1, taken with the cylinder head and its associated parts removed for better illustration.

Referring now to the drawing, an engine block 10 is shown with the cylinder head 11 mounted thereon, a gasket 13 being provided between them. The rocker-arms 14 and 15, pivoted in the conventional manner on the rocker-support 12 which forms a part of the head structure, engage the intake valve 16 and the exhaust valve 17, respectively. Each of the valves 16 and 17 is urged against its respective rocker-arm 14 and 15 by the valve springs 19 surrounding the valve guides 20 and the valve stem 21, the valve keepers 22 and the cylinder head structure positioning the springs 19.

A camshaft (not shown) controls the movement of the rocker-arms 14 and 15 by means of the push rods 24, the opening and closing of the intake valve 16 and the exhaust valve 17 responding thereto. The adjustment nut 25, attached by means of the threaded connection 26 to one portion of the rocker-arms 14 and 15, permits a more selective control of the movement of the valves. A valve cover 27 and its associated fastening means 29 is provided to protect the valve assembly.

All of the structure thus far described is conventional in valve-in-head engines and does not form a part of the present invention.

Mounted for reciprocation in the cylinder block 10 is a piston 30 having a head with a flat portion 31 and a raised portion or promontory 32 which may, in a typical embodiment, be an integral part thereof. The cylinder head 11 is provided with a flat portion 34 which, in the embodiment illustrated, happens to include the under surface of the valve 16.

When the piston 30 is at the top of its stroke, the promontory 32 approaches to within 0.05 inch or less of the opposed wall which, in the embodiment illustrated, happens to include the under surface of valve 17, to form a first quenching zone 36 and to divide the combustion chamber into combustion zones 37 and 38. At the same time the flat portion 31 of the piston 30 is extremely close to the substantially flat opposed surface 34 of the cylinder head 11 thus forming a second quenching zone 39 adjacent the second combustion zone 38 and remote from the first quenching zone 36.

In operation, when the piston 30 reaches the top of its compression stroke, the combustion chamber is effectively divided into two combustion zones 37 and 38. When the spark plug 40 ignites the mixture of combustible gases in its immediate vicinity at the time or shortly before the piston reaches the top of its stroke, the flame front travels through the combustion zone 37 and toward the combustion zone 38. Upon reaching the constriction between the promontory 32 and the opposed and immediately adjacent wall of the cylinder head, the flame is cooled due to the inherent quenching action of the immediately adjacent surfaces by reason of the high ratio of all area to enclosed volume. This is believed to delay slightly the combustion of the combustible gases in the combustion zone 38 and thereby assists in avoiding a detonation. The flame front passes the quenching zone 36, however, moves through the combustion zone 38 and is then again cooled in quenching zone 39, again by reason of the relatively high ratio of wall area to enclosed volume. Thus, the promontory 32 serves to interrupt or delay the travel of the flame front and forces intermediate cooling to occur before igniting the gases in combustion zone 38, in this manner avoiding or, if the compression ratio is high, reducing the intensity of premature detonation in the combustion chamber.

From the foregoing it will be apparent that the present invention provides a novel combustion chamber structure which not only increases the compression ratio of an engine by virtue of a reduction in the total volume of the combustion chamber, but also avoids engine knock at higher compression ratios by providing for successive burning, quenching, burning and again quenching of the ignited mixture of gases in the combustion chamber.

It is to be understood that many changes and alterations will occur to those skilled in the art upon reading the present description. All such changes and modifications are intended to come within the scope of the present invention as defined in the appended claims.

I claim:

1. In an internal combustion engine having a combustion chamber the fixed wall of which is formed at least in part by a cylinder head mounted on a cylinder block and the movable wall of which is formed by the head of a piston mounted for reciprocation in the cylinder block, the improvement which comprises a promontory extending from one of said walls of the combustion chamber to within at least about 0.05 inch of the other of said walls forming a first quenching zone momentarily dividing the combustion chamber into a first combustion zone containing ignition means and a second combustion zone when the piston is at the top of its stroke, the ratio of wall area to enclosed volume in said quenching zone being relatively high in comparison with said ratios in the combustion zones, and opposed surfaces on the fixed and movable walls of the combustion chamber approaching one another closely when the piston is at the top of its stroke momentarily to form, adjacent the second combustion zone and remote from the first quenching zone, a second quenching zone having a relatively high ratio of wall area to enclosed volume.

2. The improvement defined in claim 1 wherein the promontory is on the piston head.

3. The improvement defined in claim 1 wherein the volume of the first combustion zone is between about 20 and 50% the volume of the entire combustion chamber.

RAYMOND I. POTTER.

REFERENCES CITED

The following references are of record in the file of this patent:

UNITED STATES PATENTS

| Number | Name | Date |
|---|---|---|
| 2,323,028 | Glamann | June 29, 1943 |
| 2,324,705 | Huber | July 20, 1943 |

FOREIGN PATENTS

| Number | Country | Date |
|---|---|---|
| 635,812 | Germany | Sept. 25, 1936 |